United States Patent
Wachter et al.

(10) Patent No.: US 11,548,230 B2
(45) Date of Patent: Jan. 10, 2023

(54) METHOD FOR DETERMINING AN OPERATIONAL PARAMETER FOR AN IMAGING DEVICE

(71) Applicant: Concept Laser GmbH, Lichtenfels (DE)

(72) Inventors: Martin Wachter, Lichtenfels (DE); Tim Klaussner, Kronach (DE)

(73) Assignee: CONCEPT LASER GMBH, Lichtenfels (DE)

( * ) Notice: Subject to any disclaimer, the term of this patent is extended or adjusted under 35 U.S.C. 154(b) by 170 days.

(21) Appl. No.: 16/868,698

(22) Filed: May 7, 2020

(65) Prior Publication Data
US 2020/0353690 A1    Nov. 12, 2020

(30) Foreign Application Priority Data

May 8, 2019    (EP) ..................................... 19173374

(51) Int. Cl.
| | |
|---|---|
| *H04N 1/60* | (2006.01) |
| *B29C 64/393* | (2017.01) |
| *B33Y 50/02* | (2015.01) |
| *G05B 19/042* | (2006.01) |
| *G06T 7/00* | (2017.01) |
| *G06T 7/80* | (2017.01) |

(52) U.S. Cl.
CPC ............ *B29C 64/393* (2017.08); *B33Y 50/02* (2014.12); *G05B 19/042* (2013.01); *G06T 7/00* (2013.01); *G06T 7/80* (2017.01); *G05B 2219/49023* (2013.01)

(58) Field of Classification Search
None
See application file for complete search history.

(56) References Cited

U.S. PATENT DOCUMENTS

| | | | |
|---|---|---|---|
| 6,233,349 B1 * | 5/2001 | Gravelle | ............... G06T 7/0006 378/207 |
| 2009/0206065 A1 | 8/2009 | Kruth et al. | |

(Continued)

FOREIGN PATENT DOCUMENTS

| | | |
|---|---|---|
| CN | 108312504 A | 7/2018 |
| EP | 3470211 A1 | 4/2019 |

(Continued)

OTHER PUBLICATIONS

European Search Report Corresponding to EP191733740 dated Oct. 24, 2019.

*Primary Examiner* — Dung D Tran
(74) *Attorney, Agent, or Firm* — Dority & Manning, P.A.

(57) ABSTRACT

Method for determining an operational parameter for an imaging device for imaging at least one part of a build plane, in particular for a determination device for determining at least one parameter of an energy beam for an apparatus for additively manufacturing three-dimensional objects, comprising the steps: determining at least one spot parameter that relates to an extension of a spot, in particular a spot of an energy beam, in a determination plane; determining a difference between the determined spot parameter and a nominal spot parameter; determining an imaging parameter of the imaging device based on the determined difference adjusting the imaging parameter based on the determined difference.

20 Claims, 2 Drawing Sheets

(56) References Cited

U.S. PATENT DOCUMENTS

| | | | |
|---|---|---|---|
| 2014/0268368 A1* | 9/2014 | Chan | B23K 26/073 |
| | | | 359/717 |
| 2017/0368640 A1* | 12/2017 | Herzog | B28B 17/0081 |
| 2018/0186067 A1 | 7/2018 | Buller et al. | |
| 2018/0193959 A1 | 7/2018 | Marchione | |
| 2019/0007504 A1* | 1/2019 | Clark | G06F 3/038 |
| 2019/0009369 A1* | 1/2019 | Vorontsov | B33Y 50/02 |
| 2019/0111673 A1* | 4/2019 | Pilzweger | G05B 13/024 |
| 2019/0118300 A1 | 4/2019 | Penny et al. | |
| 2019/0240907 A1 | 8/2019 | Hunze | |
| 2020/0223139 A1* | 7/2020 | Hunze | B33Y 10/00 |
| 2020/0341255 A1* | 10/2020 | Chan | G02B 21/245 |

FOREIGN PATENT DOCUMENTS

| | | | |
|---|---|---|---|
| EP | 3524408 A1 | 8/2019 | |
| WO | WO2007/147221 A1 | 12/2007 | |
| WO | WO2019/040948 A1 | 2/2019 | |

\* cited by examiner

METHOD FOR DETERMINING AN OPERATIONAL PARAMETER FOR AN IMAGING DEVICE

PRIORITY INFORMATION

The present application claims priority to European Patent Application Serial Number 19173374.0 filed on May 8, 2019.

FIELD OF TECHNOLOGY

The present disclosure relates to a method for determining an operational parameter for an imaging device for imaging at least one part of a build plane, in particular for a determination device for determining at least one parameter of an energy beam for an apparatus for additively manufacturing three-dimensional objects.

BACKGROUND

Apparatuses for additively manufacturing three-dimensional objects are generally known from prior art that comprise imaging devices, inter alia, for determining parameters of the additive manufacturing process being performed on the apparatus. For example, an intensity distribution generated in a build plane can be monitored via such an imaging device for assuring that different parameters of the object and/or the process are met.

Due to the rapidly changing properties of an area of the build plane in which build material is irradiated, e.g. high dynamic changes of the intensity distribution in a spot of the energy beam, so-called "flickering" of the melt pool, the adjustment of operational parameters of imaging devices, in particular the adjustment of a proper focal position or focal plane, is difficult. Thus, typical autofocusing methods, such as contrast based methods or methods relying on edge detection, cannot be used for adjusting such imaging devices, as the rapidly changing/high dynamic properties of radiation emitted from the consolidation region falsifies the results of such methods.

BRIEF DESCRIPTION

Aspects and advantages will be set forth in part in the following description, or may be obvious from the description, or may be learned through practice of the invention.

A method is generally provided for determining an operational parameter for an imaging device for imaging at least one part of a build plane. In one embodiment, the method comprising: determining at least one spot parameter that relates to an extension of a spot in a determination plane; determining a difference between the determined spot parameter and a nominal spot parameter; determining an imaging parameter of the imaging device based on the determined difference; and adjusting the imaging parameter based on the determined difference.

A determination device and apparatus for additively manufacturing three-dimensional objects are also generally provided.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION OF PARTICULAR EMBODIMENTS

Figure 1:
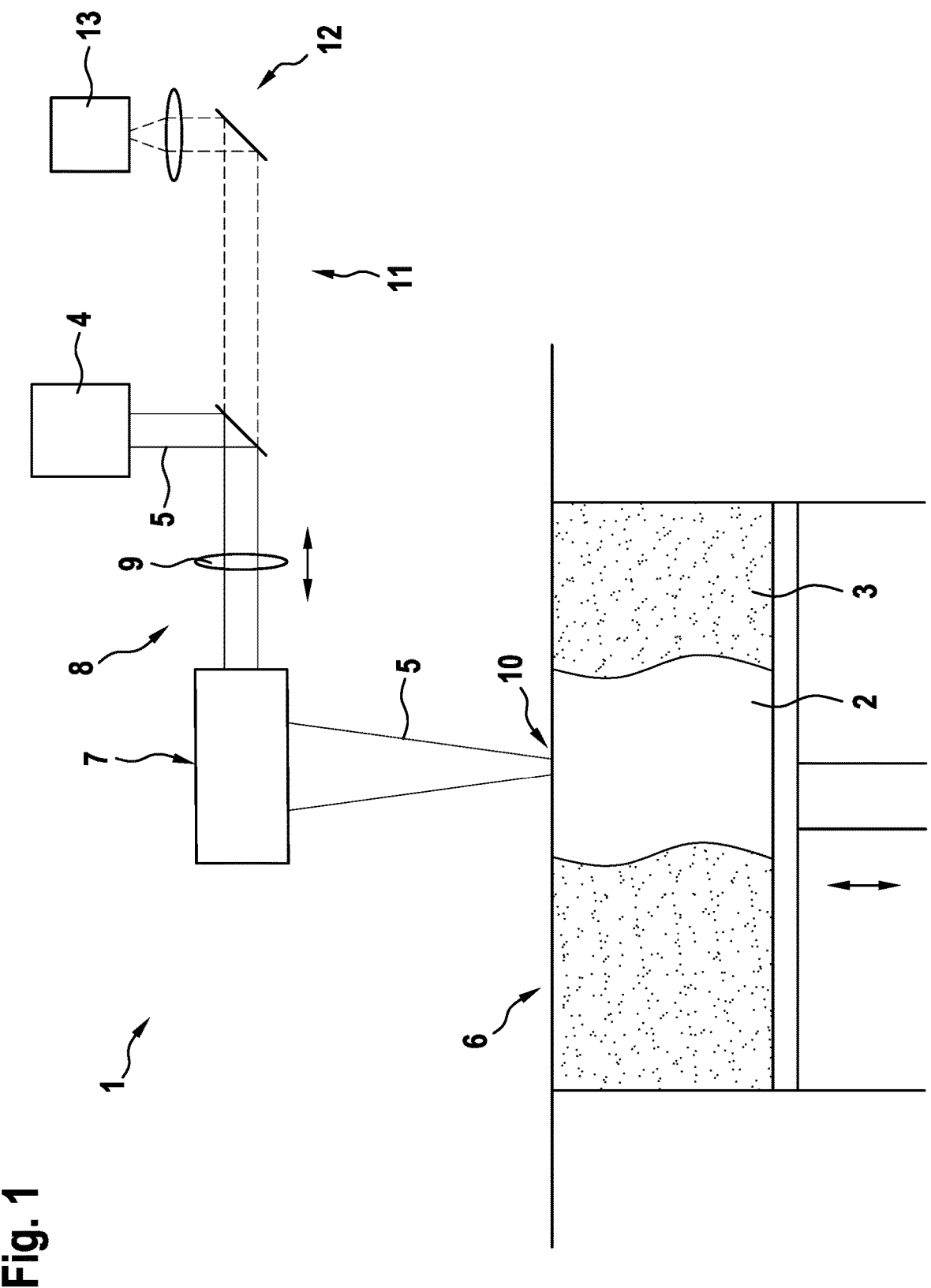
FIG. 1 shows an inventive apparatus.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An improved method is generally provided for determining an operational parameter for an imaging device, in particular suitable for determining an operational parameter for rapidly changing irradiated regions. In one embodiment, the method described herein is a method for determining an operational parameter for an imaging device, in particular an imaging device of an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, a method is generally provided for determining an operational parameter for an imaging device that is used for imaging at least one part of the build plane, e.g. for an additive manufacturing apparatus. The inventive method therefore, can be used for adjusting the imaging device, e.g. determining an operational parameter and adjusting the operational parameter for the imaging device.

Inter alia, it is possible to adjust the focal position of the imaging device for improving the determination quality. Hence, the imaging device can be adjusted more accurately for determining parameters of the additive manufacturing process and/or the object being built.

The invention is based on the idea that at least one spot parameter can be determined that relates to an extension of a spot, e.g. the spot of an energy beam, in a determination plane. Subsequently a difference between the determined spot parameter and a nominal spot parameter can be determined, e.g. calculated or measured. Based on the determined difference an imaging parameter of the imaging device can be determined. Subsequently, the imaging parameter can be adjusted based on the determined difference. For example, the imaging parameter can only be adjusted, if needed, e.g. if a significant difference between the determined spot parameter and the nominal spot parameter occurs. Inter alia, a threshold may be defined, wherein when the threshold is exceeded, an adjustment of the imaging parameter may be performed.

Alternatively to using the energy beam as spot, it is also possible to otherwise generate the spot in the determination plane, e.g. using a light source arranged in the determination plane instead of guiding the energy beam to the determination plane. For example, a light source with defined dimensions, especially representing a typical size of a spot of an energy beam, can be used for determining the spot parameter, e.g. by arranging the light source in the determination plane, wherein the light source itself may form the spot that emits radiation. The imaging device can be used to determine the spot parameter of the light source. Therefore, a light source can be used to determine the spot parameter and the image parameter outside an additive manufacturing process, in particular without the necessity to generate an energy beam. This is especially beneficial for service personnel, as no safety precautions are required, e.g. no laser safety means.

For example, a spot parameter, such as a diameter of the energy beam in a determination plane, for example the build plane, can be detected or measured via the imaging device. The spot parameter can be compared with a nominal spot parameter which can, inter alia, be defined, e.g. a minimum spot parameter. Based on the difference between the determined spot parameter and the nominal spot parameter the imaging parameter of the imaging device can be determined. In other words, it is possible to derive whether the energy beam is properly imaged via the imaging device or whether an image parameter of the imaging device has to be adjusted or can be improved. For example, if the spot parameter determined via the imaging device does not meet the correct nominal parameter, an adjustment of the focal position or other parameters of the imaging device can be performed.

Advantageously, the imaging parameter may be adjusted based on a nominal imaging parameter. In other words, it is possible to compare the imaging parameter that has been determined based on the difference between the determined spot parameter and a nominal spot parameter. If a deviation between the determined spot parameter and a nominal spot parameter is present, the determined imaging parameter will deviate from a nominal imaging parameter. Hence, an adjustment of the imaging parameter can be deemed necessary, wherein the adjustment of the imaging parameter can be performed on basis of a nominal imaging parameter, wherein e.g. the nominal imaging parameter may be set as actual imaging parameter. Thus, if the determined spot parameter deviates from a nominal spot parameter, e.g. a diameter of the spot of the energy beam in the determination plane is larger than a minimum or optimum diameter of the spot, an adjustment of the imaging parameter can be deemed necessary and can be performed based on the nominal imaging parameter.

For example, the imaging parameter may be or may relate to a focal plane of the imaging device, wherein based on the actual focal plane, the spot parameter of the spot of the energy beam, e.g. the irradiated area in the build plane, varies. Hence, the focal plane or the focal position, respectively, of the imaging device can be used as imaging parameter. Dependent on the spot parameter, in particular the size of the spot imaged to the imaging device, in particular to a determination element, such as a sensor, in particular a CCD sensor, of the imaging device, an adjustment of the imaging parameter, namely the focal plane of the determination device can be performed. In other words, different optical elements of the imaging device, such as lenses, can be positioned to adjust the focal plane of the imaging device accordingly.

According to another embodiment of the inventive method, the at least one spot parameter may be determined based on an image of the spot imaged onto a determination element. Thus, the spot of the energy beam in the build plane can be imaged to the determination element of the imaging device, wherein the spot parameter can be determined based on the image, e.g. a size of the image of the spot, such as a diameter of the spot. The determination element may, inter alia, be a line sensor a two-dimensional sensor, in particular a CCD sensor. Hence, the spot generated via the energy beam in the determination plane, e.g. the build plane, can be imaged to the determination element, wherein dependent on the used sensor, an extension of the spot for the area irradiated via the energy beam can be determined and compared with a nominal spot parameter, such as a desired diameter of the spot of the energy beam or a desired irradiated area.

As described before, the spot parameter may relate to a size of the spot, in particular an area of the spot, in the determination plane or the spot parameter may relate to a length and/or a width, in particular to a diameter, of the spot in the determination plane. Thus, it is possible to adjust the imaging parameter, e.g. adjust different settings for the focal plane and determine the spot parameter for the different settings. The size of the spot on the detector or in the determination plane can therefore, form the basis for the determination process, as, inter alia, a minimum of the size of the spot or the extension of the spot in the determination plane can be used to adjust the imaging parameter. Hence, the imaging parameter can be varied as long as a minimum of the size, e.g. a predefined value of the area of the spot, is reached.

For example, an average over a defined time interval of the intensity distribution that is generated in the determination plane via the spot of the energy beam can be generated, wherein the irradiated area imaged onto the determination element varies with the focal plane of the imaging device. By adjusting the focal plane, the size of the spot imaged to the determination element may vary, wherein an adjustment of the imaging parameter of the imaging device can be performed until a nominal imaging parameter is found. For example, a minimum number of irradiated pixels of the determination element or a maximum amplitude with which the pixels are irradiated can form the basis for the determination process.

In other words, it is possible to determine the size of the spot or the diameter of the spot by determining the size of the irradiated part of the determination element, in particular the amount of irradiated pixels, and/or the intensity distribution of the image of the spot on the determination element, in particular the amplitude of the irradiated pixels. In other words, it is possible to derive the size of the area of the spot is that is imaged onto the determination element and therefore, determine whether a proper adjustment of the imaging parameter of the imaging device is met or whether the imaging parameter can be improved. For example, by varying the focal plane or the focal position of the imaging device, the amount of irradiated pixels can vary, as the size of the area that is irradiated by the spot of the energy beam on the determination element will change. Hence, by adjusting the imaging parameter in that a minimum of irradiated pixels and/or a uniform distribution of the amplitudes of the irradiated pixels is achieved, it is assured that the imaging parameter is adjusted properly.

Thus, it is particularly possible that spot parameters are determined for at least two different imaging parameters of the determination device, in particular for two different irradiation steps, and that the imaging parameter that corresponds to the smaller spot parameter can be chosen or adjusted. For example, it is possible to determine the spot parameter for irradiation steps related to the irradiation of different layers of build material. The determined imaging parameters that are determined based on the spot parameter for each layer, can be used as feedback control for the imaging parameter of the imaging device, in particular for adjusting a focal position of the imaging device. Therefore, an automated adjustment of the imaging parameter during the additive manufacturing process can be performed. In other words, for each layer of build material that is irradiated in the build plane, a determination process can be performed to derive whether the imaging device is properly adjusted, in particular, if the focal plane lies in the determination plane, in particular in the build plane.

Further, the spot parameter may be determined for multiple different imaging parameters and the imaging parameter may be adjusted corresponding to the minimal spot parameter. Hence, as described before, the imaging parameter can be varied and the effect on the spot parameter can be measured, for example, if the spot parameter for the actual imaging parameter reaches a local minimum, it is possible to adjust the imaging parameter over a wider scale for deriving whether the resulting spot parameter, e.g. the size of the spot on the determination element, increases or decreases. Thus, it can be assured that the global minimum of the size of the spot of the energy beam on the determination element can be found and that therefore, a proper adjustment of the imaging parameter of the imaging device can be performed.

According to another embodiment of the inventive method, at least one irradiation parameter can be controlled based on the spot parameter, in particular based on the minimal spot parameter. As a correlation between the focal position of the energy beam and the focal position of the imaging device exists, it is possible to transfer shifts in the irradiation device to the imaging device and vice versa. For example changes during the additive manufacturing process, such as thermal drifts due to heating of optical elements in the apparatus, can cause a change of an imaging parameter and require the same or like changes to a corresponding irradiation parameter. For example, if the determination of the imaging parameter indicates that an adjustment to the imaging parameter is necessary, the same or like changes can be made to a corresponding irradiation parameter. Inter alia, if a change of a focal position of the imaging device has to be performed, the change of the focal position of the energy beam in the build plane can be performed.

It is also possible to alternatingly adjust the focal position of the imaging device and adjust the focal position of the irradiation device for determining a minimum spot parameter. Therefore, the size of the spot of the energy beam on the determination element can be influenced by the focal position of the irradiation device and the focal position of the imaging device and therefore, by finding a global minimum of the size of the spot of the energy beam on the determination element will result in both, the imaging device and the irradiation device being properly calibrated.

Further, the irradiation parameter and the imaging parameter can be controlled/adjusted in a closed loop process. As described before, the irradiation parameter as well as the imaging parameter can be controlled and/or adjusted during the additive manufacturing process. For example, the imaging parameter can be controlled by determining the spot parameter for a given focal position of the irradiation device, wherein the focal position of the imaging device can be varied until a nominal value for the spot parameter is reached. Simultaneously or alternatingly, an adjustment of the focal position of the irradiation device can be performed, wherein the effect on the spot parameter can be determined. For example, if a minimum spot diameter of the energy beam in the build plane and/or or on the determination element, is desired, the focal position of the imaging device and the focal position of the irradiation device can alternatingly be adjusted until a minimum for the spot parameter is found. By performing the control and/or adjustment of the imaging parameter and the irradiation parameter in a closed loop process, it is possible to assure that proper parameters are used for performing the additive manufacturing process.

According to another embodiment of the inventive method, at least one data processing step may be performed, in particular an interpolation or extrapolation, for finding the minimum and/or maximum spot parameter. Thus, it is possible to interpolate or extrapolate the imaging parameter and/or the irradiation parameter based on a determined imaging parameter or irradiation parameter, as described before. The imaging parameter may further be transmitted to at least two different apparatuses for controlling the imaging devices of the apparatuses. For example, if the method is performed in or for a plant comprising multiple similar or identical apparatuses for additively manufacturing three-dimensional objects, the determination of an imaging parameter for one of the apparatuses may be transferred to other apparatuses, e.g. two different apparatuses of the plant.

Therefore, a unified automated process may be provided, wherein the results of the determination processes can be compared with different apparatuses and used for different apparatuses. For example, a first apparatus may be used to determine an imaging parameter and at least one second apparatus may be adjusted dependent on the imaging parameter determined for or with the first apparatus. It is also possible to derive a starting point for a closed loop process performed in each apparatus, e.g. determine a nominal value for the at least one second apparatus, in particular a nominal value for the irradiation parameter and the imaging parameter.

Besides, the invention relates to a determination device for determining at least one parameter of an energy beam for an apparatus for additively manufacturing three-dimensional objects, comprising at least one imaging device for imaging at least one part of the build plane, wherein the imaging device is adapted to determine at least one spot parameter that relates to an extension of a spot of an energy beam in a determination plane and determine a difference between the determined spot parameter and a nominal spot parameter and determine an imaging parameter of the determination device based on the determined difference. Hence, the determination device may be provided for determining different parameters of the additive manufacturing process, e.g. irradiation parameters, object parameters and the like. The determination device may be understood as quality management device, inter alia, adapted to capture images of the build plane and therefrom derive quality information of the object or the process performed on an additive manufacturing apparatus. Further, the invention relates to an apparatus for additively manufacturing three-dimensional objects with at least one inventive determination device, as described before.

Self-evidently, the inventive method may be performed on the apparatus, e.g. using an inventive determination device. All details, features and advantages described with respect to the inventive method are fully transferable to the inventive determination device and the inventive apparatus.

Exemplary embodiments of the invention are described with reference to the Figures. FIG. 1 shows an apparatus 1 for additively manufacturing three-dimensional objects 2 by means of successive layerwise selective irradiation and consolidation of layers of a build material 3 via an energy source 4, e.g. a laser source, adapted to generate an energy beam 5. The energy beam 5 is focused on a build plane 6 for irradiating the build material 3 and thereby, selectively consolidating the build material 3 to build the object 2. For guiding the energy beam 5 across the build plane 6, the apparatus 1 comprises a beam guiding unit 7 which is part of an irradiation device 8, e.g. comprising at least one optical element 9 that can be moved for changing the focal position of the energy beam 5. Dependent on the focal position of the energy beam 5, the size of a spot 10 of the energy beam 5 in the build plane 6 can be adjusted.

The apparatus 1 further comprises a determination device 11 with an imaging device 12 adapted to capture images of the build plane 6 to a determination element 13, e.g. a CCD sensor. In other words, the determination device 11 is provided for determining at least one irradiation parameter, such as a parameter of the energy beam 5 in the build plane 6, or other parameters relating to the additive manufacturing process performed on the apparatus 1, such as a geometry of layers of the object 2 or the melt pool generated via the energy beam 5.

The imaging device 12 of the determination device 11 is particularly adapted to determine a spot parameter of the energy beam 5 that relates to an extension of the spot 10 in a determination plane. In this exemplary embodiment, the build plane 6 is used as determination plane. As a spot parameter in this example, the area of the spot 10 is measured, wherein it is also possible to determine another spot parameter, such as the diameter or the width of the spot 10, e.g. if different sensors are used such as line sensors or the like. Of course, it is also possible to use the determination element 13 for determining a diameter or a width of the spot 10. Alternatively, it is also possible to use a light source (not shown) which can be arranged in the build plane 6, wherein the radiation emitted from the intensity distribution generated by the light source can be understood as spot in the scope of this application. Thus, it is also possible to arrange a light source in the build plane 6 and determine the spot parameter of the light source.

After the spot parameter is determined, the difference between the determined spot parameter and a nominal spot parameter can be determined. For example, a nominal spot parameter may refer to an area or an intensity distribution the energy beam 5 should generate in the build plane 6. Thus, the nominal spot parameter may relate to a defined size of the irradiated area that is irradiated with the energy beam 5 or to a defined diameter of the spot 10, respectively. The difference between the determined spot parameter and the nominal spot parameter may be used as basis for the determination of an imaging parameter of the imaging device 12. As imaging parameter in this exemplary embodiment, the focal plane or focal position of the imaging device 12 is used. In other words, it is possible to derive, whether the imaging device 12 images the spot 10 or other parts of the build plane 6 onto the determination element 13 in the correct focal plane or focal position or whether an adjustment of the focal plane of the imaging device 12 is deemed necessary.

Figure 2:
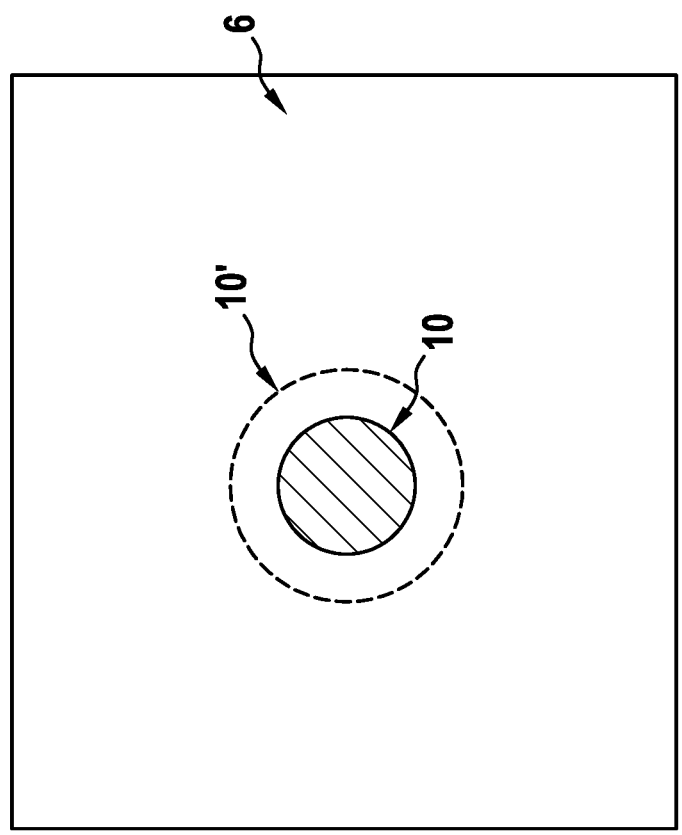
FIG. 2 shows a spot in a determination plane.

FIG. 2 shows an exemplary spot 10 of the energy beam 5 in the determination plane, e.g. the build plane 6 or on the corresponding surface of the determination element 13, e.g. a surface of a CCD sensor. For example, the size of the area of the spot 10 can be compared with a nominal spot parameter and it can be determined whether the size of the spot 10 is larger than the nominal value. If the spot 10 is larger than the nominal spot parameter, an adjustment of the focal plane of the imaging device 12 can be performed, wherein the variation of the size of the spot 10 can be measured and the imaging device 12 can be adjusted until the nominal value is reached. For example, it is possible to measure the number of pixels irradiated on the determination element 13, wherein an exemplary intensity distribution in a spot 10' is depicted. The spot 10' can be compared with the nominal spot parameter, wherein an adjustment to the imaging parameter of the imaging device 12 can be performed for reducing the size of the spot 10'. It is also possible to take the amplitude of the pixels into calculation, wherein a threshold can be defined above which the spot 10, 10' is considered as area that is irradiated with the energy beam 5.

For example, a closed loop control can be performed by adjusting the focal position of the imaging device 12 and analyzing the effect on the size of the spot 10, 10'. The process can be performed until a global a minimum of the size of the spot 10, 10' is reached, wherein, inter alia, a minimum number of irradiated pixels with a maximum amplitude per pixel can be reached.

Besides, it is also possible to adjust an irradiation parameter of the irradiation device 8, in particular a focal position of the energy beam 5 dependent on the determined imaging parameter of the imaging device 12. For example, if the spot parameter 10' is the initial value for the spot 10' of the energy beam 5, the focal position of the imaging device 12 can be varied for finding the focal plane in which the spot 10 is generated in the build plane 6. Subsequently, an adjustment of the focal plane of the energy beam 5 can be performed for verifying whether the energy beam 5 is properly focused or whether an adjustment of the focal plane of the irradiation device 8 is necessary. The calibration or determination processes can be performed in a closed loop process alternatingly for assuring that the correct focal plane or position is met for the irradiation device 8 and the imaging device 12.

Thus, it is inventively achieved that a high dynamic intensity distribution, namely the area that is irradiated with the energy beam 5 that rapidly changes and "flickers", can be imaged properly onto a determination element 13 of an imaging device 12. In particular, the method can be used to auto focus the imaging device 12 during an additive manufacturing process.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining an operational parameter for an imaging device for imaging at least one part of a build plane, the method comprising:
    determining at least one spot parameter that relates to an extension of a spot in a determination plane;
    determining a difference between the determined spot parameter and a nominal spot parameter;
    determining an imaging parameter of the imaging device based on the determined difference;
    adjusting the imaging parameter based on the determined difference;
    determining the spot parameter for at least two different imaging parameters of a determination device; and
    choosing the imaging parameter corresponding to the smaller spot parameter.

2. The method according to claim 1, wherein the at least one spot parameter relates to the extension of the spot of an energy beam.

3. The method according to claim 2, wherein the imaging parameter is or relates to a focal plane of the imaging device.

4. The method according to claim 1, further comprising: adjusting the imaging parameter based on a nominal imaging parameter.

5. The method according to claim 1, further comprising: determining the at least one spot parameter based on an image of the spot imaged onto the determination element.

6. The method according to claim 1, wherein that the determination element is a line sensor or a two-dimensional sensor.

7. The method according to claim 1, wherein that the spot parameter relates to a size of the spot in the determination plane or the spot parameter relates to a length and/or width of the spot in the determination plane.

8. The method according to claim 7, further comprising: determining the size of the spot or the length and/or width of the spot by determining the size of the irradiated part of the determination element and/or the intensity distribution of the image of the spot on the determination element.

9. The method according to claim 1, further comprising: determining the spot parameter for multiple different imaging parameters and adjusting the imaging parameter corresponding to the minimal spot parameter.

10. The method according to claim 1, further comprising: controlling at least one irradiation parameter based on the spot parameter.

11. The method according to claim 1, further comprising: controlling the irradiation parameter; and adjusting the imaging parameter in a closed loop process.

12. The method according to claim 1, further comprising: performing at least one data processing step for finding the minimum and/or maximum spot parameter.

13. The method according to claim 1, further comprising: transmitting the imaging parameter to at least two different apparatuses for controlling the imaging devices of the apparatuses.

14. The method according to claim 1, wherein that the spot parameter relates to a size of the spot in the determination plane or the spot parameter relates to a length and/or width of the spot in the determination plane.

15. A determination device for determining at least one parameter of an energy beam for an apparatus for additively manufacturing three-dimensional objects, the determination device comprising:
    at least one imaging device for imaging at least one part of the build plane, wherein the imaging device is configured to:
    determine at least one spot parameter that relates to an extension of a spot in a determination plane;
    determine a difference between the determined spot parameter and a nominal spot parameter;
    determine an imaging parameter of the determination device based on the determined difference;
    determine the spot parameter for at least two different imaging parameters of a determination device; and
    choose the imaging parameter corresponding to the smaller spot parameter.

16. A method for determining an operational parameter for an imaging device for imaging at least one part of a build plane, the method comprising:
    determining at least one spot parameter that relates to an extension of a spot in a determination plane;
    determining a difference between the determined spot parameter and a nominal spot parameter;
    determining an imaging parameter of the imaging device based on the determined difference;
    adjusting the imaging parameter based on the determined difference;
    determining the spot parameter for multiple different imaging parameters; and
    adjusting the imaging parameter corresponding to the minimal spot parameter.

17. The method according to claim 16, wherein the at least one spot parameter relates to the extension of the spot of an energy beam.

18. The method according to claim 17, wherein the imaging parameter is or relates to a focal plane of the imaging device.

19. The method according to claim 16, further comprising: adjusting the imaging parameter based on a nominal imaging parameter.

20. The method according to claim 16, further comprising: determining the at least one spot parameter based on an image of the spot imaged onto a determination element.

* * * * *